(12) United States Patent
Kim

(10) Patent No.: US 7,426,946 B2
(45) Date of Patent: Sep. 23, 2008

(54) PIPE STRUCTURE OF A WINDSHIELD WASHER FLUID FEEDING DEVICE

(75) Inventor: Sook-kie Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 804 days.

(21) Appl. No.: 10/814,508

(22) Filed: Apr. 1, 2004

(65) Prior Publication Data
US 2005/0133620 A1    Jun. 23, 2005

(30) Foreign Application Priority Data
Dec. 18, 2003    (KR)    ........................ 10-2003-0092951

(51) Int. Cl.
*B65B 39/00* (2006.01)
(52) U.S. Cl. ........................ 141/340; 141/122; 220/86.2; 137/590.5
(58) Field of Classification Search .................. 141/86, 141/122, 331–345, 348–350; 137/577, 590.5; 220/86.2
See application file for complete search history.

(56) References Cited

U.S. PATENT DOCUMENTS

| | | | |
|---|---|---|---|
| 4,494,585 A * | 1/1985 | Waldecker | 141/98 |
| 4,759,458 A * | 7/1988 | Fischer | 220/86.2 |
| 4,832,262 A | 5/1989 | Robertson | |
| 4,842,443 A * | 6/1989 | Argandona | 405/52 |
| 5,509,606 A | 4/1996 | Breithaupt et al. | |
| 6,044,517 A * | 4/2000 | Zendler et al. | 15/250.01 |
| 6,223,793 B1 * | 5/2001 | Donoughe et al. | 141/338 |
| 6,929,039 B2 * | 8/2005 | Vaitses | 141/311 A |
| 6,976,513 B2 * | 12/2005 | Schlachter | 141/88 |
| 7,017,629 B2 * | 3/2006 | Winterling | 141/327 |

* cited by examiner

*Primary Examiner*—Timothy L Maust
(74) *Attorney, Agent, or Firm*—Greenblum & Bernstein, P.L.C.

(57) ABSTRACT

A pipe structure of a windshield washer fluid feeding device for a vehicle includes a refill pipe which is used for the feeding of windshield washer fluid into a windshield washer fluid reservoir tank and has a multiply-curved form ensuring a sufficient working space between the refill pipe and a head lamp unit of the vehicle, and an auxiliary pipe connected at both ends thereof to certain portions of the refill pipe. With the combined configuration of the refill pipe and auxiliary pipe, even if the windshield washer fluid freezes, a joint region between the windshield washer fluid reservoir tank and the refill pipe is protected from damage.

2 Claims, 3 Drawing Sheets

PIPE STRUCTURE OF A WINDSHIELD WASHER FLUID FEEDING DEVICE

RELATED APPLICATION

The present disclosure relates to subject matter contained in Korean application No. 2003-92951, filed on Dec. 18, 2003, which is herein expressly incorporated by reference its entirety.

BACKGROUND OF THE INVENTION

1. Field of the Invention

The present invention relates to a pipe structure of a windshield washer fluid feeding device for a vehicle comprising a refill pipe, which is used for the feeding of windshield washer fluid into a windshield washer fluid reservoir tank and takes the form of a multiple curved pipe for ensuring a sufficient working space between the refill pipe and a head lamp unit of the vehicle, and an auxiliary pipe connected at both ends thereof to regions of the refill pipe, in order to prevent damage to the joint region between the windshield washer fluid reservoir tank and the refill pipe even in case that the windshield washer fluid contained therein freezes.

2. Description of the Related Art

As is well known, a windshield for vehicles is provided at a lower end thereof with a pair of wiper blades. These wiper blades serve to clean the windshield of rainwater or snow, dirt and other debris, thereby maintaining optimum visibility.

During the operation of the wiper blades, a windshield washer fluid feeding device is selectively operated to eject jets of windshield washer fluid onto the windshield.

Explaining schematically configuration of the windshield washer fluid feeding device, it comprises a reservoir tank for storing windshield washer fluid therein, a refill pipe connected to the reservoir tank for the replenishment of the windshield washer fluid, and a cap coupled to an upper end of the refill pipe for selectively opening and closing it.

The windshield washer fluid stored in the reservoir tank is pumped by means of a motor pump, and is ejected onto the windshield by making use of hoses and nozzles.

FIG. 1 is a sectional view illustrating a state wherein a conventional windshield washer fluid feeding device having a linear refill pipe is mounted inside a vehicle. FIG. 2 is a sectional view illustrating a state wherein another conventional windshield washer fluid feeding device having a curved refill pipe is mounted in a vehicle.

Referring first to FIG. 1, the conventional windshield washer fluid feeding device, designated as reference numeral 10, comprises a linear refill pipe 11 extending upward in a vertical direction from an upper side portion of a windshield washer fluid reservoir tank 12.

Most modern vehicles use the above-mentioned linear refill pipe.

The conventional windshield washer fluid feeding device 10, however, has a problem in that, in a mounted state thereof inside a vehicle, as can be seen from FIG. 1, the linear refill pipe 11 is positioned close to the head lamp unit 18 of the vehicle, resulting in a short distance therebetween.

Due to this distance, when exchanging or checking a bulb of the head lamp unit 18, it is difficult for an operator to insert his/her hand(s) into the narrow space defined between the rear surface of the head lamp unit 18 and the linear refill pipe 11.

In order to solve the above problem, although a solution of spacing the windshield washer fluid feeding device 10 from the head lamp unit 18 by a large distance may be considered, it complicates the design of a vehicle engine compartment, and lowers space utility thereof.

Referring to FIG. 2 illustrating another conventional windshield washer fluid feeding device, designated as reference numeral 20, it comprises a curved refill pipe 21 installed at an upper side portion of a windshield washer fluid reservoir tank 22.

In a mounted state of the windshield washer fluid feeding device 20 inside a vehicle, it will be clearly understood from FIG. 2 that a distance between the head lamp unit 18 of the vehicle and the curved refill pipe 21 is wider than that defined by the above mentioned linear refill pipe 11, resulting in an increase in the ease of exchange or checking of a bulb of the head lamp unit 18.

The curved refill pipe 21, however, has a problem in that it is difficult to integrally mold the curved refill pipe 21 with the windshield washer fluid reservoir tank 22.

This is because injection molding of the curved refill pipe and the windshield washer fluid reservoir tank is impossible due to the structure of the molds.

In the case of blow molding, although achievement of such an integrally molded structure is possible through a blowing process, it inevitably results in deterioration in the durability of the windshield washer fluid reservoir tank, and a difficulty in mass production thereof.

The curved refill pipe and the windshield washer fluid reservoir tank, therefore, should be individually molded, and then joined to each other. As a result of such an independent structure, if the windshield washer fluid freezes in the case of lower temperatures, a joint region between the curved refill pipe and the windshield washer fluid reservoir tank is expanded in volume at a curved portion of the refill pipe, resulting in breakage thereon.

SUMMARY OF THE INVENTION

Therefore, the present invention has been made in view of the above problems, and it is an object of the present invention to provide a pipe structure of a windshield washer fluid feeding device for a vehicle comprising a refill pipe, which takes the form of a multiply turned curved pipe ensuring a sufficient space between the refill pipe and a head lamp unit of the vehicle, and an auxiliary pipe integrally formed with the refill pipe, in order to ensure that the refill pipe and the auxiliary pipe define a sufficient internal space capable of covering a volume expansion of windshield washer fluid when the windshield washer fluid freezes due to a drop in temperature, resulting in prevention of damage to the refill pipe.

In accordance with the present invention, the above and other objects can be accomplished by the provision of a pipe structure of a windshield washer fluid feeding device comprising: a refill pipe in the form of a multiple curved pipe so as to define a space between the refill pipe and a head lamp unit of a vehicle, the refill pipe being joined at one end thereof to a windshield washer fluid reservoir tank; and an auxiliary pipe connected at both ends thereof to certain regions of the refill pipe so as to be integrally formed with the refill pipe.

With such a configuration, by virtue of the fact that the refill pipe takes the form of a multiple curved pipe, it is spaced apart from a head lamp unit, thereby ensuring sufficient working space required for exchanging or checking of the head lamp unit. Further, by virtue of an integral structure of the refill pipe and the auxiliary pipe, breakage of the refill pipe in winter is prevented.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Reference will now be made in greater detail to a preferred embodiment of the invention, an example of which is illustrated in the accompanying drawings.

Figure 1:
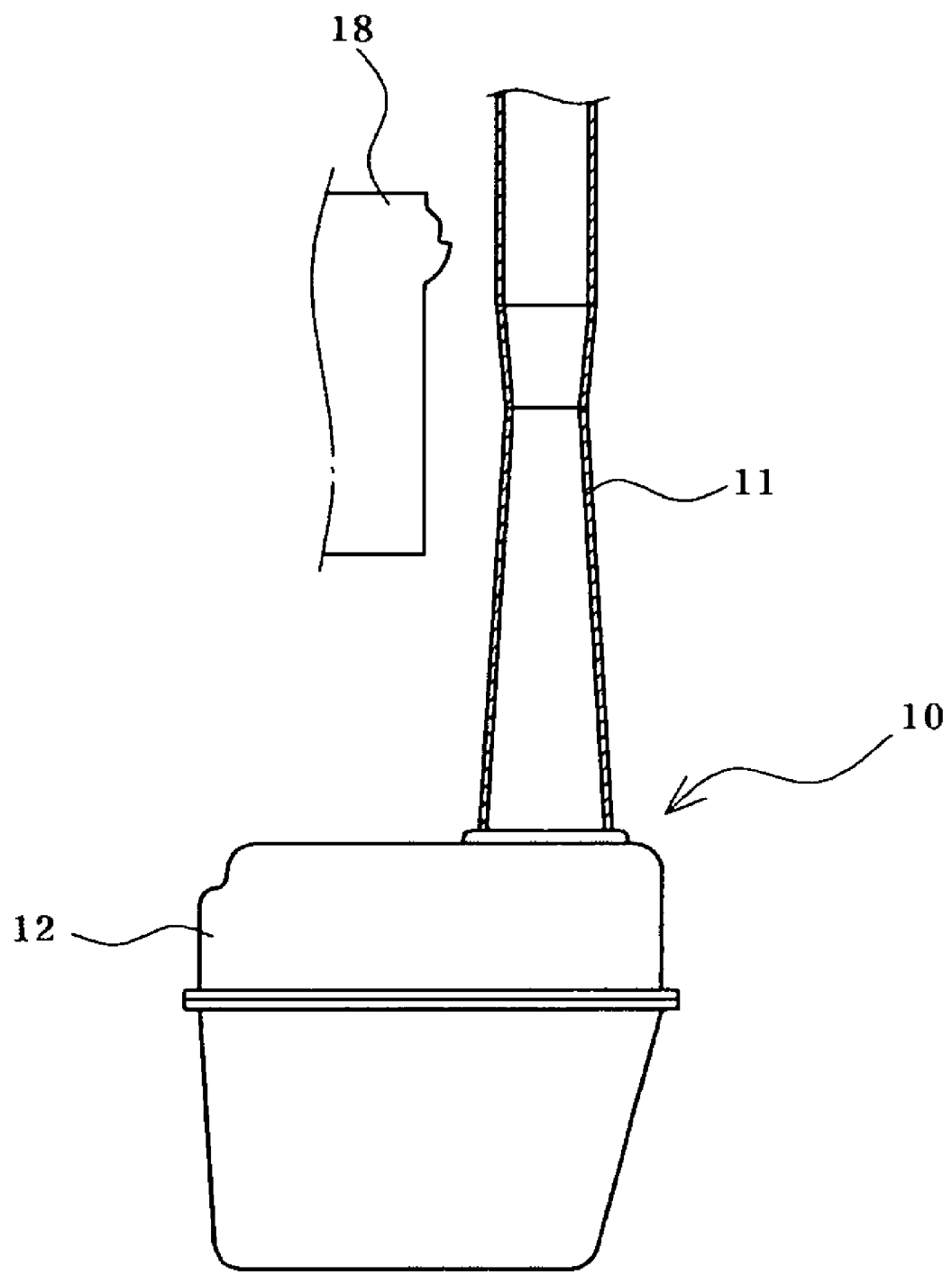
FIG. 1 is a sectional view illustrating a state wherein a conventional windshield washer fluid feeding device having a linear refill pipe is mounted in a vehicle.
Figure 2:
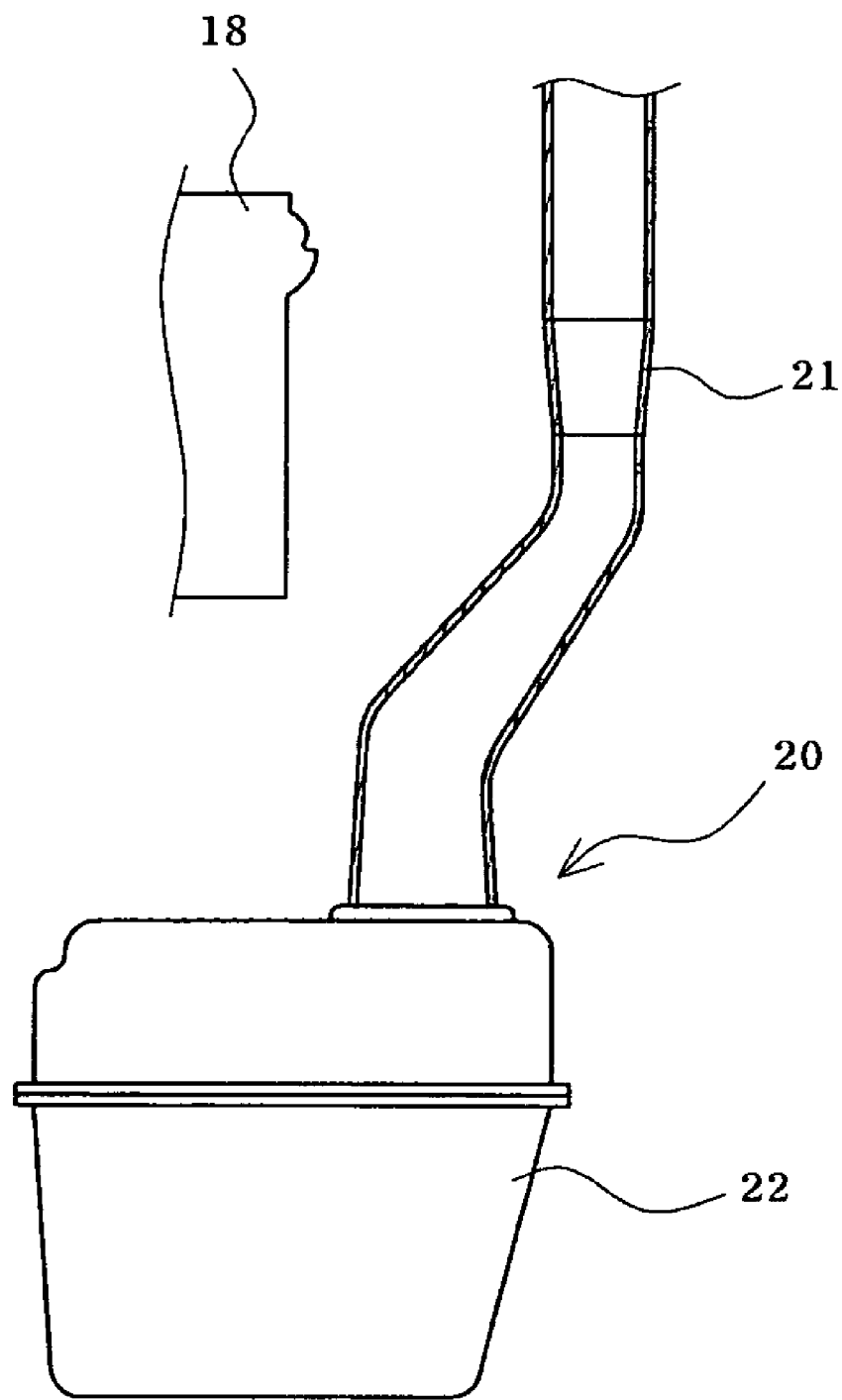
FIG. 2 is a sectional view illustrating a state wherein a conventional windshield washer fluid feeding device having a curved refill pipe is mounted in a vehicle.
Figure 3:
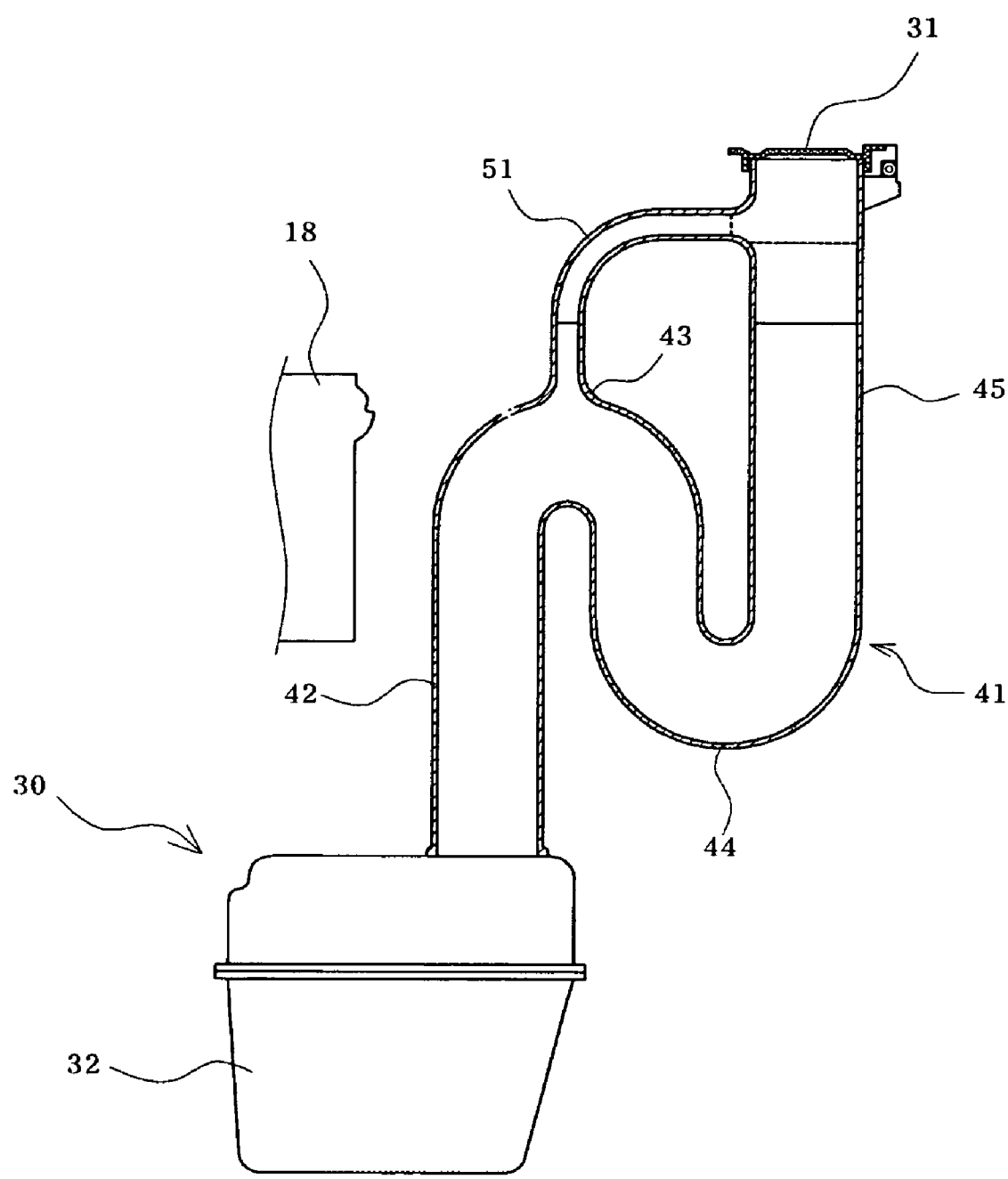
FIG. 3 is a sectional view illustrating a state wherein a windshield washer fluid feeding device of the present invention, having a refill pipe and an auxiliary pipe integrally formed to each other, is mounted in a vehicle.

Referring to FIG. 3 illustrating, inside a vehicle, a mounted state of a windshield washer fluid feeding device having an integral pipe structure in accordance with the present invention, it comprises a refill pipe 41 taking the form of a multiple curved pipe, and an auxiliary pipe 51, which is connected at both ends thereof to certain regions of the refill pipe 41 so as to be integrally formed with the refill pipe 41. The refill pipe 41 is joined at one end thereof to a windshield washer fluid reservoir tank 32 and is closed at the other end thereof with a cap 31.

The refill pipe 41 serves as a connection passage during the replenishment of windshield washer fluid into the windshield washer fluid reservoir tank 32.

In this case, such a multiple turned curved form of the refill pipe 41 ensures a wide space between the refill pipe 41 and a head lamp unit 18, resulting in sufficient working space required for exchanging or checking of a head lamp therebetween.

The refill pipe 41 can be formed into various shapes, aside from the above described shape, as long as it is distantly spaced apart from the head lamp unit 18. As a representative example thereof, as shown in FIG. 3, the refill pipe 41 includes a joining pipe 42 which is directly joined to the windshield washer fluid reservoir tank 32 and extends upward in a vertical direction, an inverse U-shaped pipe 43 extending from the joining pipe 42, a U-shaped pipe 44 extending from the inverse U-shaped pipe 43, and a vertical pipe 45 extending upward in a vertical direction from the U-shaped pipe 44.

The auxiliary pipe 51, formed with the refill pipe 41, is connected at one end thereof to the top portion of the inverse U-shaped pipe 43, and at the other end thereof to an upper end portion of the vertical pipe 45.

Now, the operation and effects of the windshield washer fluid feeding device configured as stated above will be explained.

In a state wherein the windshield washer fluid reservoir tank 32 is filled with windshield washer fluid, and an extra amount of the windshield washer fluid is further filled in both the refill pipe 41 and the auxiliary pipe 51 up to a level marked by solid lines shown in FIG. 3, if the windshield washer fluid freezes due to a drop in temperature, it is expanded up to a level marked by a dashed line shown in FIG. 3.

By virtue of sufficient inner space defined by both the refill pipe 41 and the auxiliary pipe 51, even if the windshield washer fluid freezes, the refill pipe 41 and the auxiliary pipe 51 sufficiently cover the volume expansion of the windshield washer fluid therealong while preventing the windshield washer fluid from applying an expansion pressure to a joint region between the refill pipe 41 and the windshield washer fluid reservoir tank 32. Therefore, no damage to the joint region of the refill pipe 41 occurs.

Further, by virtue of the multiply turned curved form of the refill pipe 41, a wide space is defined between the refill pipe 41 and the head lamp unit 18, thereby ensuring that a sufficient working space required for the exchange and checking of the head lamp unit is defined.

As apparent from the above description, the present invention provides a pipe structure of a windshield washer fluid feeding device comprising a multiple curved refill pipe, and an auxiliary pipe integrally formed with the refill pipe, so as to prevent breakage in a joint region between the refill pipe and a windshield washer fluid reservoir tank even if the windshield washer fluid freezes all.

Further, according to the present invention, since, inside a restricted engine compartment space, a sufficient space can be defined between the refill pipe and a head lamp unit due to the multiply turned curved form of the refill pipe, it is possible to secure a sufficient working space required to conveniently exchange or check the head lamp unit.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pipe structure of a windshield washer fluid feeding device comprising:
    a refill pipe having a multiply-curved shape so as to define a wide space between the refill pipe and a head lamp unit of a vehicle, the refill pipe being joined at one end thereof to a windshield washer fluid reservoir tank; and
    an auxiliary pipe connected at both ends thereof to the refill pipe and integrally formed with the refill pipe,
    wherein the refill pipe includes:
    a joining pipe which is joined to the windshield washer fluid reservoir tank and is extended upward in a vertical direction;
    an inverse U-shaped pipe extending from the joining pipe;
    a U-shaped pipe extending from the inverse U-shaped pipe; and
    a vertical pipe extending upward in a vertical direction from the U-shaped pipe.

2. A pipe structure of a windshield washer fluid feeding device comprising:
    a refill pipe having a multiply-curved shape so as to define a wide space between the refill pipe and a head lamp unit of a vehicle, the refill pipe being joined at one end thereof to a windshield washer fluid reservoir tank; and
    an auxiliary pipe connected at both ends thereof to the refill pipe and integrally formed with the refill pipe,
    wherein the auxiliary pipe communicates at the one end thereof with an uppermost portion of an inverse U-shaped pipe, and at the other end thereof with an upper end portion of a vertical pipe.

* * * * *